Patented Feb. 8, 1938

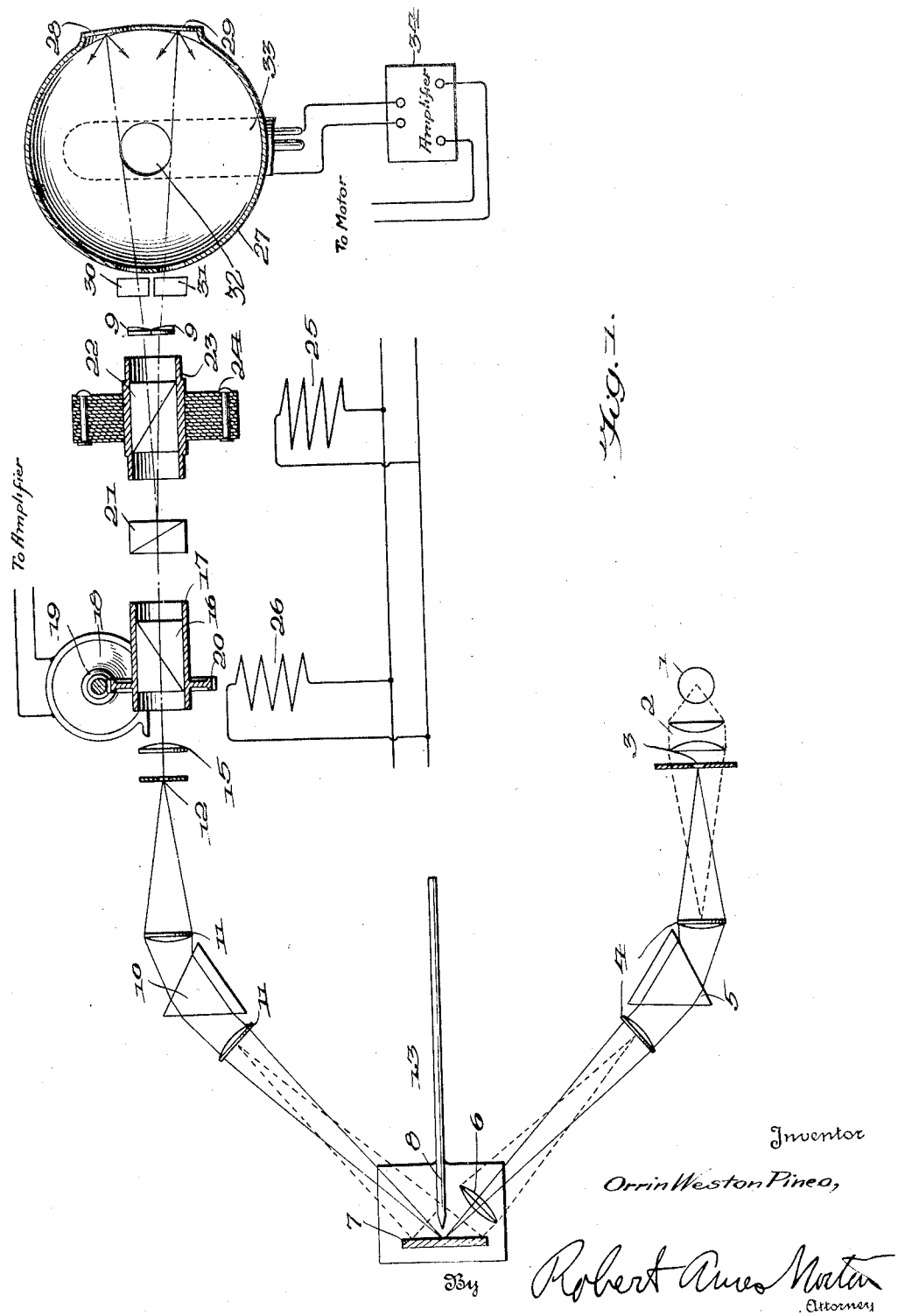

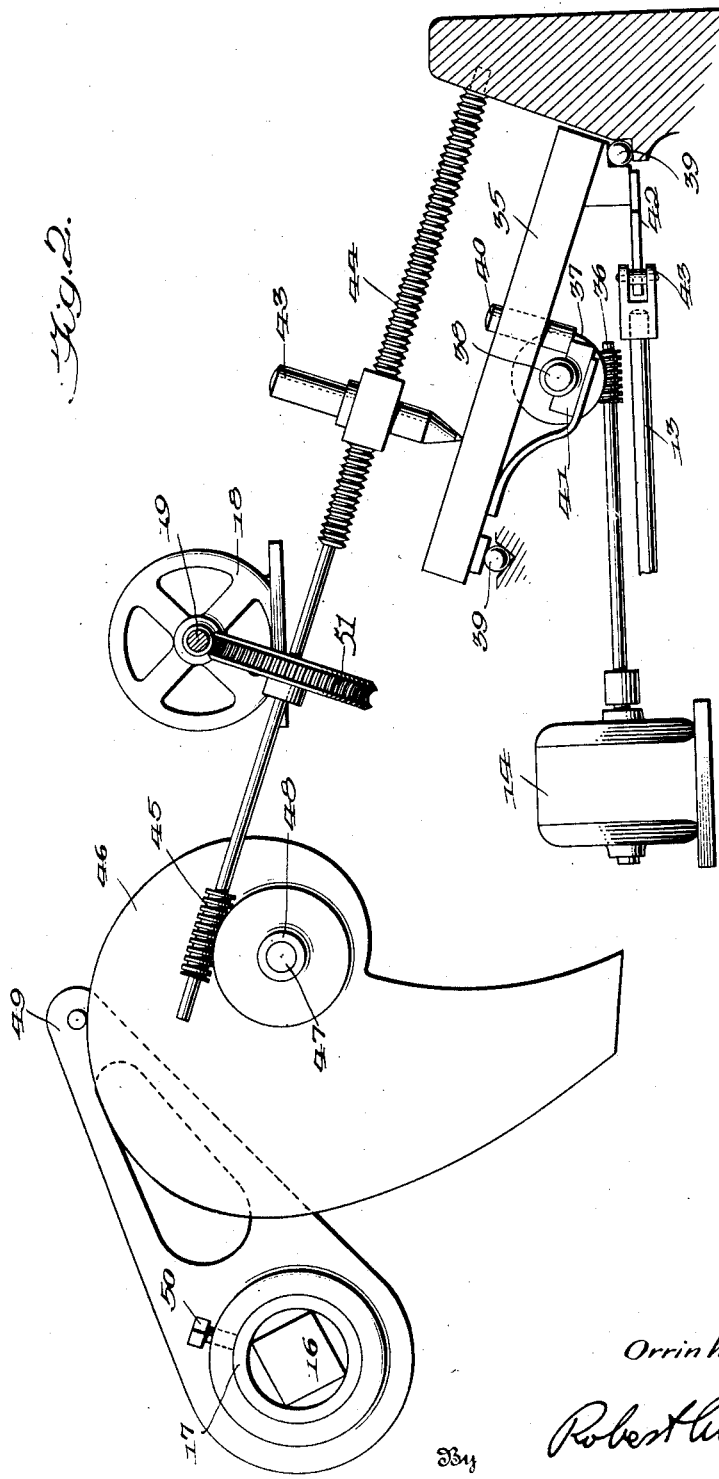

2,107,836

UNITED STATES PATENT OFFICE 2,107,836

SPECTROPHOTOMETER

Orrin Weston Pineo, Milo, Maine, assignor to The Calco Chemical Company, Inc., Bridgewater Township, Somerset County, N. J., a corporation of Delaware Application February 24, 1936, Serial No. 65,489

5 Claims. (Cl. 88—14)

This invention relates to an improved photoelectric spectrophotometer.

It has been proposed in the past to measure the reflection characteristics of a colored surface by mounting a target having the colored surface to be measured together with a target of standard white reflecting surface in an integrating sphere and to subject the two targets to flickering beams of light which vary from minimum to maximum in sine squared waves 180° out of phase so that when the flickering beams are of equal intensity the total light at any instant in the integrating sphere is constant if the two reflecting surfaces show the same reflecting power for the beams. The flickering beams may be of monochromatic light varying from one end of the spectrum to the other by using a suitable monochromator. Under any conditions where the reflected light from each of the two surfaces to be measured is not the same the total light emitted from a suitable opening in the integrating sphere will fluctuate at the flicker frequency. The flickering beams in the prior art are produced by causing a suitable plane polarizing prism such as a Nicol or Rochon prism to rotate in the beam of monochromatic light at one half the flicker frequency. The beam which is therefore plane polarized by the rotating prism is then passed through a Wollaston prism which separates the beam into two beams plane polarized at right angles to each other. Since the plane of polarization rotates due to rotation of the flicker prism it will cause each beam from the Wollaston prism to vary in intensity from maximum to minimum twice during each rotation of the flicker prism and since the two beams from the Wollaston prism are polarized at right angles the rise and fall of intensity of the beams due to flicker prism rotation is 180° out of phase. These beams pass through a rotatable Nicol or Rochon prism and then enter the integrating sphere through separate apertures striking the two targets. When the axis of the second Rochon prism is at 45° to the planes of polarization of the two beams the effect on each beam is the same, if, however, one beam, due to greater reflecting power of the target it encounters, contributes a greater amount of reflected light in the integrating sphere this unbalance can be compensated for by rotating the second Rochon prism so that its transmission of the beam encountering the target of weaker reflecting power is increased and its transmission of the beam encountering greater reflecting power is decreased until a balance is reached in the reflected light from the two beams in the integrating sphere. The degree of rotation of the second Rochon prism is a measure of the amount of the original unbalance in reflected light from the two beams.

In order to make the device automatic it has been proposed to cause the flickering light in the integrating sphere, when the reflection of the beams from the targets becomes unbalanced, to impinge on a photo-cell in order to transform it into electric impulses alternating at flicker frequency which are amplified through a high gain vacuum tube amplifier and then fed into the armature of a motor capable of rotating the second Rochon prism. The field of the motor is supplied with a constant alternating current of the same frequency as the flicker frequency. Any unbalance in reflected light from the two beams will therefore produce a flickering light which when transformed into electrical impulses and amplified causes the motor to turn the second prism until the rotation of the prism exactly compensates for the difference in reflected light from the two targets at which time no fluctuations of light at flicker frequency are observable in the integrating sphere and correspondingly since there is no longer alternating current of flicker frequency in the output tube of the vacuum tube amplifier the motor rotating the second prism stops. The amount of rotation of the second Rochon prism may be observed by using a pointer with a suitable scale.

The above described instrument possesses three serious disadvantages which render it commercially useless. The first and most serious disadvantage is that the accuracy of the machine is absolutely dependent on exactly symmetrical flickering beams of equal average intensity at all wave lengths at the equality setting of the axis of the second or photometric prism. This is only possible when the beam striking the rotating flicker prism is free from polarized component because if there is any polarization in any particular plane this polarization will result in a beam which varies in intensity as well as in its plane of polarization leaving the flicker prism. If the degree of polarization in the monochromator were constant at all wave lengths of light it would be possible to compensate therefor by a suitable change in the scale on the photometric prism but unfortunately the amount of polarization in any monochromator varies with light of different wave lengths and hence the device hitherto proposed will not give a true measure of difference in reflection of two samples for light of different wave lengths. Any curves prepared from the readings of such a machine will therefore not be true curves of light reflecting power for different colors. This fundamental inaccuracy makes the device hitherto proposed practically useless for any work requiring any degree of accuracy.

The second disadvantage of the prior art device even with light which is not monochromatic lies in the fact that the beams illuminating the two targets are polarized in the same plane, which plane is determined by the variable angle through which the second Rochon prism is turned in order to balance the beams. This introduces an undesirable variability in the measurement of many samples, such as satin for instance, whose reflection is dependent on the orientation of the plane of polarization of the illuminating beam. This disadvantage that the mode of testing depends on the answer to the test applies to the prior art instrument even when used as a photometer instead of a spectrophotometer.

The third disadvantage, although less fundamental, lies in the fact that the rotation of the photometric prism in order to compensate for varying light reflection is not a linear function of the reflected light differences but operates on a complicated formula, the difference in light reflection being substantially proportional to the square of the tangent of the angle through which the photometric prism has to be turned in order to compensate for the reflected light variation. It is thus necessary to read the setting of the photometric prism at each wave length on a distorted scale and to plot the points by hand to produce a curve. As a result if a curve of great accuracy requiring a large number of points is needed the time required to make such a curve is long because each point requires a setting of the monochromator to a particular wave length and the reading of the corresponding position of the photometric prism on a suitable scale. Because of the large amount of time required to make a curve the proposed device is suitable only for research problems where labor is of small consequence.

The present invention overcomes the first disadvantage set out above by reversing the positions of the photometric prism and flicker prism, that is to say, the beam from the monochromator, or other light source, passes through the photometric prism then through the Wollaston prism and finally through the rotating flicker prism. This rearrangement of parts completely avoids non-uniformity of beam due to varying amounts of polarization in the monochromator at different wave lengths since all of the light impinging on the Wollaston prism first passes through the photometric prism and the only effect of a greater or less degree of polarization in the light source is to cause a small variation in total transmission of light through the photometric prism since all of the light passing through the photometric prism and impinging on the Wollaston prism is plane polarized and the only effect of varying amount of polarization of the beam striking the photometric prism is that a greater or less percentage of the light which is polarized in a plane which does not correspond to the plane of transmission of the photometric prism is absorbed. In other words, the only effect of varying polarization in the monochromator is to vary to some extent the total intensity of the beam of uniformly polarized light which is thrown from the photometric prism onto the Wollaston prism. This will of course, vary the total amount of light in the two flickering beams but the variation will be precisely the same for each beam and since the integrating sphere, photo-cell and associated amplifier operate only on a difference in light between the two beams after reflection from the targets the result is not at all affected by a variation in the total quantity of light in the two beams provided this variation is the same for both beams.

The present invention therefore by interchanging two of the units in the prior device performs all of the functions of the prior device and also performs an additional and very important function of complete accuracy at different wave lengths produced in the monochromator. In its broader aspects the present invention covers any photometer in which monochromatic, or other light, is passed through a photometric prism, then through a Wollaston prism, then through a flickering mechanism to an integrating device and the movement of the photometric prism is controlled by amplified light fluctuations at flicker frequency. Broadly, therefore, the invention is not concerned with the particular means associated with the photometric prism to utilize its movement as a measure of the unbalance of light from two samples. The present invention may, of course, also use uniform targets in an integrating sphere and interpose transparent cells containing a standard and the color to be measured in the two flicker beams so that unbalance of transmitted light rather than reflected light can be measured in the same way by the machine.

In a more specific aspect, in order to avoid the third disadvantage, the invention includes means associated with the photometric prism and with the monochromator to produce automatically a graph or curve correctly representing, in percentage, the transmission or reflecting characteristics of the samples to be measured. In this more specific embodiment recording means are provided in which a recording pen or other recording means moves over a suitable recording surface so as to trace a graph of the transmission or reflection characteristics of the sample to be tested. As any such graph has two sets of coordinates, that is to say, wave length of monochromatic light and transmission or reflection percentage in terms of a given standard, the recording means must be given movement responsive to changes in the two coordinates. A simple form consists in a moving table or rotating drum which moves in proportion to the wave length of light, or if desired, in proportion to light frequencies. This may be effected very simply by moving the table and cam to actuate the monochromator so as to shift the light emitted progressively through the spectrum. As the movement of the parts of the monochromator is not uniform throughout the spectrum, a larger movement being necessary for a given change in wave length at the violet end of the spectrum than is necessary at the red end, the movement of the monochromator requires a drive of varying ratio from the table which can be effected most simply by a cam having a suitable profile. Of course, if the curve is drawn on nonlinear paper corresponding to the characteristics of the monochromator a direct drive may be used. However, for most graphs it is desirable to have wave length coordinates on uniformly graduated paper and in such cases the drive through a cam, or other means for variable drive ratio, is desirable. The present invention is not concerned with any particular design of means for shifting the monochromatic light through the spectrum.

According to the present invention the rotation of the photometric prism is coupled to the recording mechanism through coupling means of such a nature that the recording means moves in accordance with the function $\tan^2 \alpha$ where $\alpha$ is the angle through which the photometric prism is turned. While the invention is not limited to any particular coupling means one of the simplest involves the use of a cam, the surface of which is shaped to produce through linkage a rotation of the photometric prism such that its relation to the movement of the recording means is as set out above. In the more specific description which follows in conjunction with the drawings an adaptation of this invention will be shown in which the motor driven by the amplified flicker frequency current moves a pen linearly through suitable reduction gearing, and rotates the photometric prism through such a cam and suitable linkage. The photometric prism may also be rotated through direct gearing by the motor and the recording means operated through a cam with a suitable surface. If the recording element is driven from the cam a very large cam is necessary having dimensions approximately twice the size of the graph paper because of the fact that the movement of the recording means is greater than the angular movement of the prism. Such very large cams are awkward in practical machines and while the operation with such large cams is just as accurate in practical machines it is preferable to move the photometric prism by the cam as in this case small cams can be used. Recording means may also be operated in which the paper or other recording surface is moved proportional to the square of the tangent of the angle of rotation of the photometric prism and the recording stylus is linearly moved as the light from the monochromator passes through the various wave lengths of the spectrum. Inasmuch as the amount of power which is available at flicker frequency to drive the motor operating the photometric prism is limited due to the limits in practical gain available in a vacuum tube amplifier it is usually preferable for practical purposes to operate the recording stylus from the drive for the photometric prism and the recording surface from the drive which traverses the monochromator through the spectrum since this latter drive may utilize power from the electric line and is not limited in the amount of power available. This is, however, purely a practical consideration since the invention operates precisely as effectively if the two components of the recording mechanism are reversed.

The invention will be described in greater detail in conjunction with the drawings in which:

Fig. 1 is a semi-diagrammatic representation of a spectrophotometer without recording means;

Fig. 2 is an elevation of a recording means in a spectrophotometer according to the present invention capable of giving a curve representing color characteristics of a particular sample at all wave lengths.

In Fig. 1 the monochromator consists of an incandescent lamp 1, preferably of the low voltage compact filament type, a pair of condensing lenses 2, a variable slit 3, collimating lenses 4, first prism 5, lens 6, mirror 7, knife edge 8, second prism 10, collimating lenses 11 and exit slit 12. The mirror and knife edge may be reciprocated by means of the rod 13 moving the slit defined by the knife edge through the spectrum so that the light passing slit 12 can be caused to traverse the visible spectrum.

The light leaving the slit 12 of the monochromator is focused by lens 15 onto the photometric prism 16 which is of a conventional Nicol or Rochon type. The prism is mounted in the hollow shaft 17 which is rotated by the motor 18 through the worm 19 and ring gear 20. The plane polarized beam leaves the photometric prism and passes through a Wollaston prism 21 where it is separated into two beams plane polarized at right angles to each other and the two beams pass through a flicker prism 22 which is mounted in a hollow shaft 23 being the center of the rotor 24 of a synchronous motor, the field 25 of which is energized by 60 cycle alternating current which is also used to energize the field 26 of the motor 18. The beams after passing through the flicker prism and the decentered lenses 9 enter the integrating sphere 27 and strike targets 28 and 29. If desired, transmission cells 30 and 31 may be interposed in the two beams before they enter the integrating sphere.

In the wall of the integrating sphere is an aperture 32 through which the integrated light from the sphere passes and impinges on a photo-cell 33. The current from the photo-cell is amplified at flicker frequency by a high gain vacuum tube amplifier 34 and the amplified current which is also at flicker frequency is then fed to the armature of the motor 18 which rotates the photometric prism.

In operation the movement of the carriage carrying the mirror 7 and knife edge 8 causes the light from the monochromator to traverse the spectrum. The photometric prism plane polarizes a beam defined by the shape of the slit 12 and this beam will vary slightly in intensity with the degree of polarization in the monochromator at different wave lengths. The plane of polarization of the beam leaving the photometric prism is, of course, determined by the position of the prism which in turn determines the relative brightness of the two polarized beams leaving the Wollaston prism. The flicker prism 22 rotates at 1800 R. P. M. in order to give a flicker frequency of 60 cycles per second since each beam passes through 2 cycles from maximum to minimum for every revolution of the flicker prism. The flickering beams encountering the two targets 28 and 29 are reflected in accordance with the reflecting characteristics of the target surfaces at the particular wave length of monochromatic light or if uniform targets are used and cells of material are inserted at 30 and 31 the beams will vary in accordance with the transmission characteristics at the particular wave length of the comparison cell and the cell to be measured. The paths of the light rays are indicated on the drawings by lines in the customary manner.

Any unbalance in total light reflected from the respective targets during a complete cycle will produce a total variation of light in the integrating sphere, the variation being at flicker frequency, that is to say, 60 cycles per second. This 60 cycle current, together with any stray fluctuations at other frequencies which may result from the characteristics of the targets, are then amplified by the high gain amplifier which should be capable of amplifying a voltage produced by the photo-cell in the grid circuit of the first amplied tube of the order of 10 microvolts so as to produce an output from the amplifier of the order of 10 watts. This amplified current which of course contains as one of its main components the 60 cycle flicker frequency is then fed into the armature of the motor 18. Since the field of the motor 18 receives pure 60 cycle A. C. the motor will respond substantially only to the 60 cycle flicker frequency, in other words, the motor may be considered as a very sharply selective device which responds only to the frequency in its field. The motor rotates and moves the photometric prism until the latter has varied the relative intensity of the two beams from the Wollaston prism by an amount exactly sufficient to compensate for the variation in the light reflected from each target at which time there is no fluctuation of light in the integrating sphere at flicker frequency and, therefore, there will be no amplified 60 cycle flicker frequency in the tube of the amplifier and hence the motor 18 will stop. The highly selective characteristic of the motor 18 is very important since stray effects make it impossible to produce in the photo-cell output circuit anything like a pure sinusoidal 60 cycle current. On the contrary an oscillogram of the amplified photo-cell output shows the presence of an enormous number of stray frequencies. Because of the great selectivity of the motor 18, however, it is actuated only by the 60 cycle component and therefore gives a true response to beam unbalance. The direction in which the motor 18 rotates depends, of course, on the phase of the 60 cycle component in the amplifier output which reverses with reversal of the relative intensity of the reflected light from the two beams. Thus, for example, if there is unbalance so that the light reflected from target 28 is greater than that from 29, the resulting 60 cycle component after being amplified will have one phase, as compared to the 60 cycle current flowing in the field windings of the motor, whereas if the opposite condition takes place, that is to say, if the reflected light beam from target 29 is greater than that from 28 the 60 cycle component in the output will have exactly the reverse phase and, of course, will turn the motor 18 but in the opposite direction. Before the photometer is put into operation initially it is necessary to adjust the phase of the amplifier current so that the motor turns in the right direction and with maximum torque. This latter is adjusted by positioning the field 25 within its mount or the photometric prism 22 within the rotor 24 angularly about the axis of rotation of the rotor so that the optical variation of the beams at flicker frequency has a thus determined phase such to produce, in the corresponding electrical variation excited in the armature of the motor 18 by means of the photocell 33 and amplifier 34, a phase related to the fixed phase in the fields 25 and 26 to give maximum torque in the direction toward balance. A reversal of leads, of course, will result in the motor turning the photometric prism away from balance instead of toward balance.

In Fig. 1 a flicker system is shown in which the flicker prism itself is rotated. Other flickering mechanisms may, of course, be used.

Fig. 2 shows in detail recording means used in conjunction with the spectrophotometer of Fig. 1 to produce a continuous graph of reflection or transmission characteristics of a given sample at the various wave lengths throughout the spectrum. Like parts bear like numerals. A wave length traversing motor 14 drives a worm 36 which rotates a worm wheel 37 keyed on a screw threaded shaft 38, the rotation of which causes a table 35 to move along the shaft. The table is supported on a suitable ball bearing 39 and is provided with a disengaging button 40 operating a spring held latch 41 which engages the screw thread on the shaft 38. One end of the table 35 carries a cam 42 which bears on a cam follower 43 on the end of the shaft 13 which shifts the monochromator mirror carriage to cause the monochromator light to traverse the spectrum. The profile of the cam 42 is chosen so that the movement of the shaft 13 will cause equal displacements of wave length in the monochromator light for equal movements of the table 35. Since the traversing of the monochromator is directly effected by movement of the table the latter can be moved rapidly by pressing the button 40 and moving the table by hand. This permits a rapid return of the table when a graph has been drawn and makes it unnecessary to return the table slowly by operation of the motor 14. Of course, if desired, the motor 14 may drive both the table and the cam directly, in which case manual return is not possible. I prefer, however, to use the form of drive shown where the table is moved by the motor and the table, in turn, actuates the monochromator.

A stylus 43 is on the threaded shaft 44 which is driven by the photometric prism motor 18 through a worm 19 and worm gear 51. The shaft 44 also carries a worm gear 45 which drives a shaft 47 through a worm gear 48. On the shaft 47 is keyed the cam 46 and the cam in turn moves a crank arm 49 which moves the photometric prism 16 mounted in its hollow shaft 17. The profile of the cam is so chosen that the movement of the stylus 43 is proportional to the square of the tangent of the angle through which the prism 16 is moved. The stylus 43 will therefore respond to the percentage of difference in total light from the samples in the two beams and, therefore, the recording means will draw a graph which shows percentage of light transmission or reflection, as the case may be, of the sample at any wave length. In order to make fine adjustments so that the reflection from or transmission of the standard will correspond to 100% on the graph paper which is clamped to the table 35, it is some times necessary to make minute adjustments on the prism 16 and this may be done by means of the set screw 50 which permits shifting the hollow shaft 17 slightly in the crank arm 49. Such adjustment will be necessary only when the machine is first put into operation.

It is sometimes desirable to change the percentage transmission scale on the graph, thus, for example, it may be desirable to cause a greater movement of the stylus 43 for a given percentage change in reflection or transmission characteristic of the sample. This may be effected by changing the gear ratio between the shaft 44 and the shaft 47 or by using a shaft 44 with a different pitch of screw thread. In every case the response of the stylus 43 will still be proportional to the square of the tangent of the angle through which the prism 16 is turned but this proportion may be multiplied by constant factors introduced by the gear ratio and screw pitch.

In operation a sample to be tested for reflection forms one of the targets, for example 29, whereas target 28 is a standard white surface which may be obtained by smoking a magnesium carbonate block with magnesium oxide or in the case of fabrics an undyed fabric may be used as the standard. The synchronous motor rotating the flicker prism 22 is then started and brought up to speed. The wave length traversing motor 14 is then started at one end of the spectrum. The unbalance between the reflected beams at the start is amplified and the motor 18 rotates until the photometric prism 16 has been turned by the cam through a sufficient angle to balance the beams. The amount of rotation will move the stylus down the paper to the ordinate corresponding to a certain percentage of reflection. As the monochromator slowly traverses the spectrum the table 35 moves in step with it and at each wave length the motor 18 rotates in one or the other direction until the photometric prism has restored balance in the reflected beams. The stylus therefore draws a continuous curve or graph which is a true plot of the percentage reflection of the given sample corresponding to each wave length of the spectrum. Since cam 46 causes the motion of the stylus to be in proportion to the square of the tangent of the angle through which photometric prism 16 is turned the graph will plot true percentages.

When it is desired to measure the transmission of a colored solution or transparent or translucent colored substance, instead of reflection, the two targets 28 and 29 are made uniform white targets and the cell containing water or other standard is inserted at 30 while a cell containing the solution or a piece of the transparent material is inserted at 31. The measurement of the light transmission at different wave lengths proceeds precisely as described above in connection with the recording of a curve defining the reflecting characteristics, although, of course, the nature of the curve for a given coloring matter will naturally be different.

Not only does the recording spectrophotometer described in connection with Fig. 2 avoid all inaccuracies due to varying polarization in the monochromator at different wave lengths but a true graph of the transmission or reflecting characteristics of a color at different wave lengths is obtained rapidly; thus, in practice on a standard commercial machine it is possible to draw a graph in from 2½ to 3 minutes which time should be compared with the half an hour or more that would be necessary for visual observation at each wave length and manual plotting of the curve. Moreover, the curve is more accurate since it is continuous and as the speed with which the table moves is very slow compared to the speed of the motor 18 which balances the beams, the curve is almost 100% accurate at every point even in portions where the curve slope is steep. Since no calculation is necessary the machine may be operated by relatively untrained personnel and the amount of expense of making graphs is enormously reduced.

The recording spectrophotometer described in detail above utilizes a stylus and paper for drawing a curve. This is the most practical arrangement in most cases. The invention, however, is not limited to such a recording mechanism and the graph may be drawn photographically by moving a suitable light spot or by any other means which will give a record in the form of a graph. It is only necessary that the recording means involve a coupling to the drive of the photometric prism 16 which will give a response in the recording mechanism varying in proportion to the square of the tangent of the angle through which the photometric prism is rotated.

The spectrophotometer described in detail in connection with the drawings shows essentially a source of light passing through a monochromator then through the photometric prism, the Wollaston prism, the flickering device to the samples followed by the photo-cell which responds to the total light from the samples. In its broader essentials the invention depends for its accuracy on the relative positions of the photometric prism, the Wollaston prism, the flickering mechanism and the sample, the arrangement being that the flickering mechanism is between the Wollaston prism and the sample and that the photometric prism is on the opposite side of the Wollaston prism. The essential principle by which the invention operates depends on the fact that the flickering mechanism will always permit measuring accurately the fluctuations in light from the elements adjacent to it. In the present invention the flickering device is adjacent to the samples and will therefore permit accurate measurement of the light variations due to the samples. The arrangement shown in the prior art in which the flicker member is adjacent to the light source causes it to measure accurately variations in the light encountering it, whether from a monochromator or other light source. It is, therefore, in the prior art, accurately measuring the wrong thing since it is not desired to measure the fluctuations in the monochromator but the fluctuations from the sample. From considerations relating to economy of light, the arrangement shown in the drawings is most desirable, that is to say, where light from the source passes through the monochromator then through the photometric polarizing device, the Wollaston prism, the flickering mechanism to the sample and thence to the photo-cell. While, therefore, in its essential principles the present invention is dependent on the arrangement of sample, flickering mechanism, Wollaston prism and photometric member such that the flickering mechanism is between the Wollaston prism and the sample, I prefer for practical commercial use to use the efficient arrangement shown in the drawings, although it should be understood that in its broadest principles the present invention is not limited to such an arrangement of light source, monochromator and photo-cell.

This application is in part a continuation of my copending application, Serial No. 17,392, filed April 20, 1935.

What I claim is:

1. A photometric apparatus comprising a photoelectric device arranged to receive integrated light from a sample and a standard, an optical system arranged to control the light received by said device comprising in series an angularly movable polarizing member, a second member having the property of dividing a light beam into two beams which are polarized respectively in planes at right angles to each other and a third member between the second member and the sample and standard capable of causing each beam to flicker from a minimum to a maximum, the flickering of the two beams in opposite phase, and means by which the first polarizing member may be angularly adjusted in accordance with the output of the photoelectric device.

2. A photometric apparatus comprising a photoelectric device arranged to receive integrated light from a sample and a standard, an optical system arranged to control the light received by said device comprising in series an angularly movable polarizing member, a second member having the property of dividing a light beam into two beams which are polarized respectively in planes at right angles to each other, a uniformly rotatable third member between the second member and the sample and standard capable of causing each beam to flicker by varying from a minimum to a maximum, the variation being in opposite phase, electric driving means for the first member responsive to alternating current of a predetermined frequency, means for uniformly rotating the beam flickering member at such a speed as to cause the beams to flicker at the same frequency to which the driving means of the first member is responsive, the photoelectric device being coupled to an amplifier capable of amplifying alternating current fluctuations produced by the device in response to fluctuations of light impinging thereon at flicker frequency, means for feeding the alternating current components of the amplifier output to the electric driving means for the first polarizing member, the phase of the flicker frequency of the amplifier output and electric driving means being so adjusted as to cause the polarizing member to rotate in a direction to produce the same total light from the sample and standard.

3. A photometric apparatus comprising a photoelectric device arranged to receive integrated light from a sample and a standard, an optical system arranged to control the light received by said device comprising in series an angularly movable polarizing member, a second member having the property of dividing a light beam into two beams which are polarized respectively in planes at right angles to each other and a third member between the second member and the sample and standard capable of causing each beam to flicker from a minimum to a maximum, the flickering of the two beams in opposite phase, and means by which the first polarizing member may be angularly adjusted in accordance with the output of the photoelectric device and means for passing to the first polarizing member a beam of substantially monochromatic light, said means being further capable of varying the wave length of said monochromatic light from one end of the spectrum to the other.

4. A photometric apparatus comprising a photoelectric device arranged to receive integrated light from a sample and a standard, an optical system arranged to control the light received by said device comprising in series an angularly movable polarizing member, a second member having the property of dividing a light beam into two beams which are polarized respectively in planes at right angles to each other, a uniformly rotatable third member between the second member and the sample and standard capable of causing each beam to flicker by varying from a minimum to a maximum, the variation being in opposite phase, electric driving means for the first member responsive to alternating current of a predetermined frequency, means for uniformly rotating the beam flickering member at such a speed as to cause the beams to flicker at the same frequency to which the driving means of the first member is responsive, the photoelectric device being coupled to an amplifier capable of amplifying alternating current fluctuations produced by the device in response to fluctuations of light impinging thereon at flicker frequency, means for feeding the alternating current components of the amplifier output to the electric driving means for the first polarizing member, the phase of the flicker frequency of the amplifier output and electric driving means being so adjusted as to cause the polarizing member to rotate in a direction to produce the same total light from the sample and standard and means for passing to the first polarizing member a beam of substantially monochromatic light, said means being further capable of varying the wave length of said monochromatic light from one end of the spectrum to the other.

5. In a photometric apparatus which operates by measuring the difference in reflection or transmission characteristics of a sample and a standard on symmetrical flickering beams encountering the sample and standard respectively, which apparatus includes sample, standard, flickering mechanism, a device for dividing a light into two beams polarized in planes at right angles to each other and a photometric polarizing member capable of angular movement, the improvement which comprises arranging the above referred to elements in a series in which the flickering mechanism is between the samples and the member dividing the light into two beams which are polarized in planes at right angles to each other and the polarizing photometric member is positioned on the opposite side of the member which divides light into two beams.

ORRIN WESTON PINEO.